United States Patent
Chi et al.

(10) Patent No.: US 12,250,018 B1
(45) Date of Patent: *Mar. 11, 2025

(54) MIMO TRANSCEIVER ARRAY FOR MULTI-BAND MILLIMETER-WAVE 5G COMMUNICATION

(71) Applicant: Swiftlink Technologies Inc., Richmond (CA)

(72) Inventors: Taiyun Chi, Atlanta, GA (US); Hua Wang, Atlanta, GA (US); Thomas Chen, Richmond (CA)

(73) Assignee: Swiftlink Technologies Inc., Richmond (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/825,578

(22) Filed: Sep. 5, 2024

(51) Int. Cl.
*H04B 1/40* (2015.01)

(52) U.S. Cl.
CPC ..................... *H04B 1/40* (2013.01)

(58) Field of Classification Search
CPC .............. H04B 1/16; H04B 1/30; H04B 1/18; H04B 1/006; H04B 1/26; H04B 1/707; H04B 1/7075; H04B 1/709; H04B 1/005; H04B 1/04; H04B 1/0475; H04B 1/12; H04B 1/408; H04B 1/7097; H04B 15/00; H04B 2001/0416; H04B 2001/0491; H04B 2201/709727; H04B 7/08; H04B 1/0057; H04B 10/25753; H04B 17/364
USPC .......................................................... 455/73
See application file for complete search history.

(56) References Cited

U.S. PATENT DOCUMENTS

| | | |
|---|---|---|
| 5,483,679 A | 1/1996 | Sasaki |
| 7,065,327 B1 | 6/2006 | Macnally et al. |
| 10,440,584 B1 | 10/2019 | Labadie et al. |
| 2004/0203472 A1 | 10/2004 | Chien |
| 2005/0170789 A1 | 8/2005 | Consolazio |
| 2008/0057899 A1 | 3/2008 | Montemayor et al. |
| 2009/0140920 A1 | 6/2009 | Frigon et al. |
| 2010/0113090 A1 | 5/2010 | Lin et al. |
| 2011/0234293 A1 | 9/2011 | Shanan |

(Continued)

OTHER PUBLICATIONS

Welp, Benedikt, A Mixed-Mode Beamforming Radar Transmitter MMIC Utilizing Novel Ulrawideband IQ-Generation Techniques in SiGe BiCMOS—IEE Transactions on Microwave Theory and Techniques, vol. 66, No. 6, Jun. 2018.

(Continued)

*Primary Examiner* — Ajibola A Akinyemi
(74) *Attorney, Agent, or Firm* — WOMBLE BOND DICKINSON (US) LLP

(57) ABSTRACT

According to one embodiment, a compact broadband radio frequency (RF) frontend circuit includes a number of single-channel transceivers, a number of analog to digital converters (ADCs), where each of the ADCs is coupled to one of the single-channel transceivers, a number of digital to analog converters (DACs), where each of the DACs is coupled to one of the single-channel transceivers, and a digital signal processing (DSP) unit coupled to the ADCs and the DACs. The DSP unit is configured to generate a first set of digital data streams simultaneously and each of the first set of digital data streams is converted by a respective one of the DACs into an analog data stream to be transmitted to a remote device by a respective one of the single-channel transceiver.

20 Claims, 4 Drawing Sheets

(56) References Cited

U.S. PATENT DOCUMENTS

| | | | |
|---|---|---|---|
| 2015/0326285 A1* | 11/2015 | Zirwas | H04B 7/0452 375/267 |
| 2015/0351084 A1 | 12/2015 | Werb | |
| 2016/0099820 A1 | 4/2016 | Chakrabarti et al. | |
| 2016/0178730 A1 | 6/2016 | Trotta et al. | |
| 2016/0329921 A1 | 11/2016 | Jussila et al. | |
| 2017/0111095 A1 | 4/2017 | Maltsev et al. | |
| 2017/0208621 A1 | 7/2017 | Dutta et al. | |
| 2017/0230091 A1 | 8/2017 | Song et al. | |
| 2018/0083720 A1 | 3/2018 | Kollmann et al. | |
| 2018/0083763 A1 | 3/2018 | Black et al. | |
| 2018/0175949 A1* | 6/2018 | Rao | H04B 17/354 |
| 2018/0203658 A1 | 7/2018 | Files et al. | |
| 2019/0200270 A1* | 6/2019 | Yu | H04W 36/30 |
| 2019/0312604 A1* | 10/2019 | Huang | H03F 3/68 |
| 2020/0067497 A1* | 2/2020 | Frounchi | H03K 5/13 |

OTHER PUBLICATIONS

Wikipedia contributors. "In-phase and quadrature components." Wikipedia, The Free Encyclopedia. Wikipedia, The Free Encyclopedia, Sep. 16, 2021. Web. Nov. 12, 2021.

Juntunen E., "Low-Power, High-Efficiency, and High-Linearity CMOS Millimeter-Wave Circuits and Transceivers for Wireless Communications" A dissertation presented to the Academic Faculty of the School of Electrical and Computer Engineering, Georgia Institute of Technology, Atlanta, GA, Aug. 2012.

\* cited by examiner

MIMO TRANSCEIVER ARRAY FOR MULTI-BAND MILLIMETER-WAVE 5G COMMUNICATION

FIELD OF THE INVENTION

Embodiments of the present invention relate generally to wireless communication devices. More particularly, embodiments of the invention relate to multiple-input and multiple-output (MIMO) transceiver arrays for a communication device.

BACKGROUND

For next-generation 5G communication devices, a higher data rate is required for many applications such as augmented reality (AR)/virtual reality (VR), and 5G MIMO. A design shift towards millimeter-wave (mm-Wave) frequency supports this higher data rate. Mm-Wave communication however heavily relies on beamforming techniques to improve receiver signal-to-noise ratio (SNR) and transmitter effective isotropic radiated power (EIRP). Conventional analog beamforming techniques (such as phased-array) can steer beams in a desired direction by providing constructive and destructive interference signals through phase shifting an emitted signal for each of a number of radiating elements at the RF front-end.

For example, in a phased-array transmitter, an RF signal is split into N RF signals. The N RF signals are phase-shifted and are delivered to N antennas to be radiated out by the N antennas. In a phased-array receiver, RF signals received by an antenna array are each phase-shifted depending on the angle of arrival and summed to maximize signal-to-noise ratios. Although phased array transmitters and receivers are simple and cost effective to implement, however, typically, only one beam is generated and only one data stream is supported at any one time. This limits the number of users whom can use the data stream for wireless communication.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
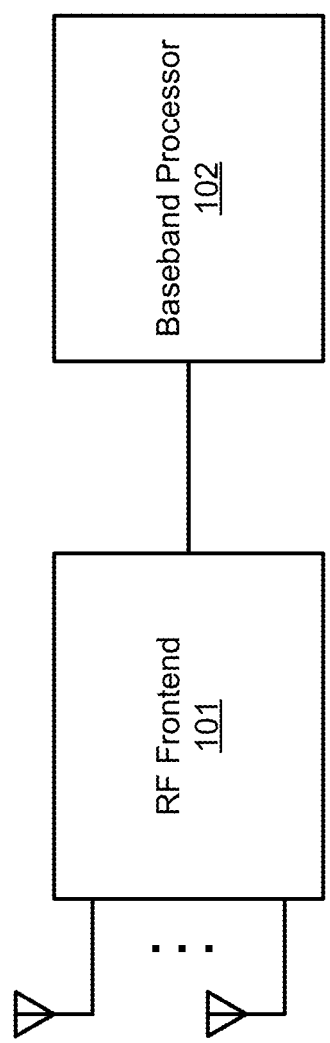
FIG. 1 is a block diagram illustrating an example of a wireless communication device according one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a", "an", and "the" include plural references. The meaning of "in" includes "in" and "on".

As used herein, unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. The term "substantially" herein refers to being within 10% of the target.

For purposes of the embodiments described herein, unless otherwise specified, the transistors are metal oxide semiconductor (MOS) transistors, which include drain, source, gate, and bulk terminals. Source and drain terminals may be identical terminals and are interchangeably used herein. Those skilled in the art will appreciate that other transistors, for example, Bi-polar junction transistors—BJT PNP/NPN, BICMOS, CMOS, etc., may be used without departing from the scope of the disclosure.

According to one aspect, a radio frequency (RF) frontend circuit includes a number of single-channel transceivers, a number of analog to digital converters (ADCs), where each of the ADCs is coupled to one of the single-channel transceivers, a number of digital to analog converters (DACs), where each of the DACs is coupled to one of the single-channel transceivers, and a digital signal processing (DSP) unit coupled to the ADCs and the DACs. The DSP unit is configured to generate a first set of digital data streams simultaneously and each of the first set of digital data streams is converted by a respective one of the DACs into an analog data stream to be transmitted to a remote device by a respective one of the single-channel transceiver.

In one embodiment, the single-channel transceivers include a number of identical channels. In another embodiment, the single-channel transceivers support a number of users using these identical channels. In one embodiment, each of the single-channel transceivers transmits and receives an independent data stream. In one embodiment, the single-channel transceivers include a number of antennas each corresponding to a separate radiation angle.

In one embodiment, the antennas track a user moving within a corresponding radiation angle. In another embodiment, the antennas track users moving within the corresponding radiation angle. In one embodiment, each of the single-channel transceivers includes a bias interface. In one embodiment, each of the single-channel transceivers includes a digital interface.

In one embodiment, the DSP unit is further configured to receive a second set of digital data streams from the ADCs. In another embodiment, each of the second digital data streams is received by a respective one of the single-channel transceiver via a specific radiation angle. In another embodiment, the second set of digital data streams are received simultaneously. In another embodiment, the second set of digital data streams are synchronized in time. In another embodiment, the first set of digital data streams are synchronized in time.

FIG. 1 is a block diagram illustrating an example of a wireless communication device according one embodiment of the invention. Referring to FIG. 1, wireless communication device 100, also simply referred to as a wireless device, includes, amongst others, an RF frontend module 101 and a baseband processor 102. Wireless device 100 can be any kind of wireless communication devices such as, for example, mobile phones, laptops, tablets, network appliance devices (e.g., Internet of thing or IoT appliance devices), etc.

In a radio receiver circuit, the RF frontend is a generic term for all the circuitry between the antenna up to and including the mixer stage. It consists of all the components in the receiver that process the signal at the original incoming radio frequency, before it is converted to a lower frequency, e.g., IF. In microwave and satellite receivers it is often called the low-noise block (LNB) or low-noise downconverter (LND) and is often located at the antenna, so that the signal from the antenna can be transferred to the rest of the receiver at the more easily handled intermediate frequency. A baseband processor is a device (a chip or part of a chip) in a network interface that manages all the radio functions (all functions that require an antenna).

In one embodiment, RF frontend module 101 includes one or more RF transceivers, where each of the RF transceivers transmits and receives RF signals within a particular frequency band (e.g., a particular range of frequencies such as non-overlapped frequency ranges) via one of a number of RF antennas. The RF frontend IC chip further includes an IQ generator and/or a frequency synthesizer coupled to the RF transceivers. The IQ generator or generation circuit generates and provides an LO signal to each of the RF transceivers to enable the RF transceiver to mix, modulate, and/or demodulate RF signals within a corresponding frequency band. The RF transceiver(s) and the IQ generation circuit may be integrated within a single IC chip as a single RF frontend IC chip or package.

Figure 2:
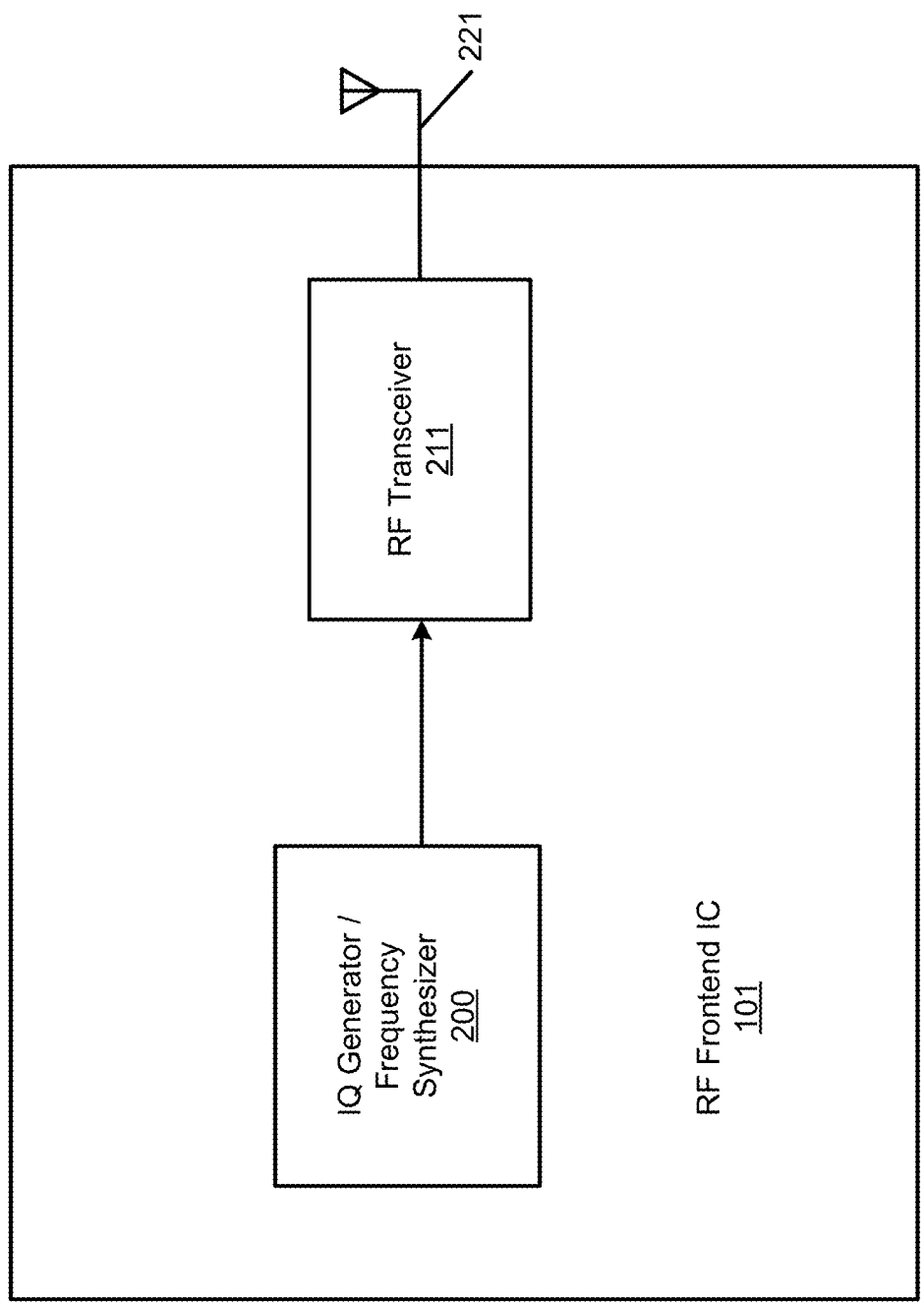
FIG. 2 is a block diagram illustrating an example of an RF frontend integrated circuit according to one embodiment.

FIG. 2 is a block diagram illustrating an example of an RF frontend integrated circuit according to one embodiment of the invention. Referring to FIG. 2, RF frontend 101 includes, amongst others, an IQ generator and/or frequency synthesizer 200 coupled to a RF transceiver 211. Transceiver 211 is configured to transmit and receive RF signals within one or more frequency bands or a broad range of RF frequencies via RF antenna 221. In one embodiment, transceiver 211 is configured to receive one or more LO signals from frequency synthesizer 200. The LO signals are generated for the one or more corresponding frequency bands. The LO signals are utilized to mix, modulate, demodulated by the transceiver for the purpose of transmitting and receiving RF signals within corresponding frequency bands. Although there is only one transceiver and antenna shown, multiple pairs of transceivers and antennas can be implemented, one for each frequency bands.

Figure 3:
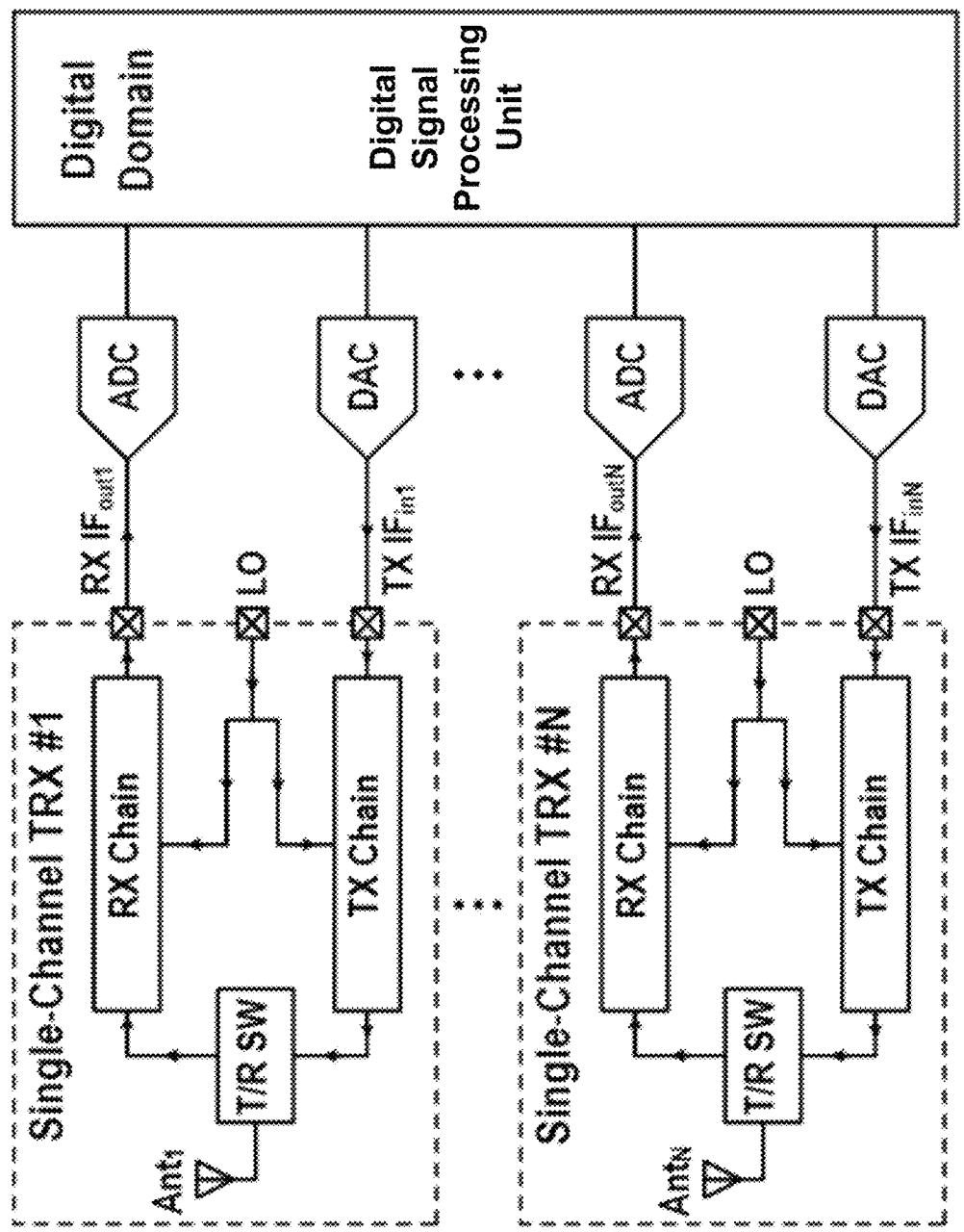
FIG. 3 is a block diagram illustrating an example of a MIMO transceiver according to one embodiment.

FIG. 3 is a block diagram illustrating an example of a MIMO transceiver according to one embodiment. MIMO transceiver 300 may represent RF transceiver 211 of FIG. 2. Referring to FIG. 3, MIMO transceiver 300 includes a number of single-channel transceivers (e.g., single-channel TRX #1 single-channel TRX #N), analogic digital converters (ADCs), digital-analog converters (DACs), and a digital signal processing unit. The digital signal processing unit can process digital signals in a digital domain. The single-channel transceivers each can include an up-conversion TX chain, a down-conversion RX chain, a T/R switch, and an antenna. The single-channel transceivers can each receive/transmit a respective analog stream simultaneously from/to one or more remote devices (e.g., a cellular mobile device, user equipment, and/or a cellular mobile device site) independent of the rest of the single-channel transceivers. Each of the ADCs can convert an analog signal to a digital signal. Each of the DACs can convert a digital signal to an analog signal. As shown, pairs of ADCs and DACs are coupled to each one of the single-channel transceivers to convert data streams from/to an analog domain to/from the digital domain. In one embodiment, the DSP unit is configured to generate a first set of digital data streams simultaneously and each of the first set of digital data streams is converted by a respective one of the DACs into an analog data stream to be transmitted to a remote device by a respective one of the single-channel transceiver.

In one embodiment, the single-channel transceivers, e.g., single-channel TRX #1 . . . single-channel TRX #N, have identical channels. In one embodiment, the RF frontend circuit is part of a cellular handheld user mobile device. In another embodiment, the RF frontend circuit is part of a cellular mobile device site which can stream data to one or more cellular handheld user mobile devices. In another embodiment, the identical channels can stream data to one or more cellular handheld user mobile devices by transmitting and receiving a respective independent data streams.

In one embodiment, the single-channel transceivers each can include an antenna which can include a directional antenna. The directional antenna of each of the single-channel transceivers can correspond to a different radiation angle or a similar radiation angle in comparison with the other directional antennas of the RF frontend. For example, different radiation angles can help track a user moving within many corresponding radiation angles while similar radiation angles can track two or more users moving within a corresponding radiation angle or similar radiation angles.

In one embodiment, the DSP unit is further configured to receive a second set of digital data streams from the ADCs. In one embodiment, each of the second set of digital data streams is received by a respective one of the single-channel transceiver via a specific radiation angle. In one embodiment, the second set of digital data streams can be received simultaneously. In one embodiment, the second set of digital data streams are synchronized in time. In one embodiment, the first set of digital streams are synchronized in time.

Figure 4:
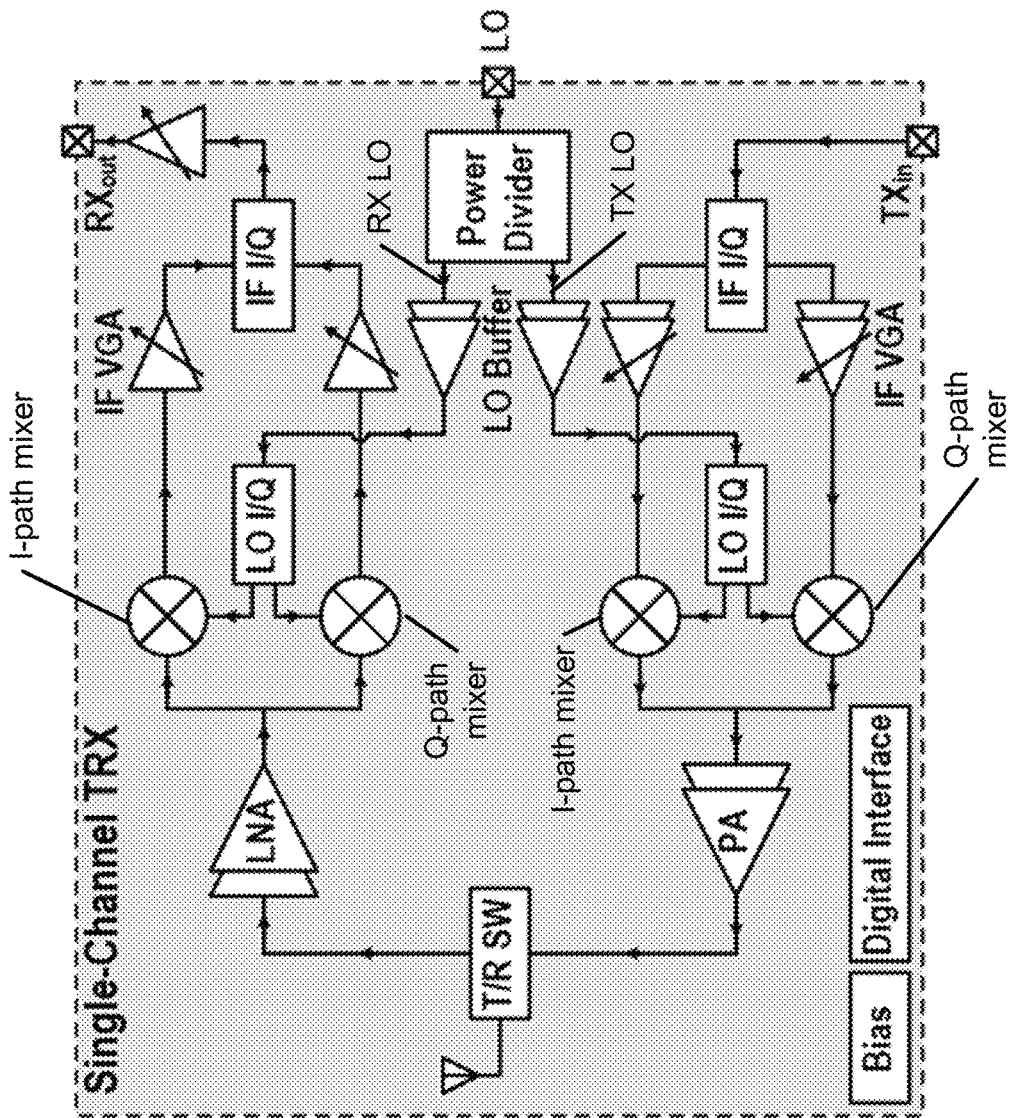
FIG. 4 is a block diagram illustrating an example of a single-channel transceiver circuit according to one embodiment.

FIG. 4 is a block diagram illustrating an example of a single-channel transceiver circuit according to one embodiment. Referring to FIG. 4, single-channel transceiver 400 may represent single-channel TRX #1 of FIG. 3. Transceiver 400 is configured to transmit/receive RF signals for a single-channel. The single-channel can be a single frequency channel. In one embodiment, in the TX chain, transceiver 400 can include a power amplifier (PA), in-phase/quadrature (I/Q) up-conversion mixer(s), a local oscillator (LO) buffer, a LO I/Q generation network, IF variable-gain amplifiers (VGAs), and an IF I/Q generation network. The TX chain can include two paths, 1) I path for processing in-phase component signals and 2) Q-path for processing quadrature component signals. In one embodiment, IF I/Q quadrature network can generate a I component signal and a Q component signal based on an intermediate signal to be transmitted (e.g., TXin signal). The I and Q component signals can be further amplified by IF VGA. Up-conversion mixers for each of the I-path and the Q-path receives the amplified I and Q component signals and the LO I/Q signals (generated by the LO I/Q generation network based on an TX LO signal) and mixes/modulates the IF I/Q-path component signals to a higher frequency band. The higher frequency I and Q component signals are then recombined and amplified by the PA before being transmitted to the antenna via a T/R switch to be radiated by the antenna.

In one embodiment, for the RX chain, transceiver 400 can include a low-noise amplifier (LNA), I/Q down-conversion mixer(s), a LO buffer, an LO I/Q quadrature generation network, an IF I/Q quadrature generation network, and IF VGAs. The TX chain and RX chain can be coupled by a T/R switch, which is coupled to the antenna. Similar to the TX chain, the RX chain can include two paths, 1) I path for processing in-phase component signals and 2) Q-path for processing quadrature component signals. In one embodiment, the RX chain receives an RF signal, via the antenna, from a remote device and the RF signal is amplified by the LNA (which may or may not include a band pass filter). The I-path down-convert mixer and the Q-path down-convert mixer mixes/demodulates the RF signal into I-path signals and Q-path signals using the LO I/Q components (e.g., generated by LO I/Q generation network based on an RX LO signal). The I-path and Q-path signals can be further amplified by I-path and Q-path IF VGAs. The IF I/Q quadrature generation network can then generate an RXout signal based on the amplified I-path and Q-path signals. In one embodiment, the RXout signal may be further amplified by additional amplifiers or VGAs.

In one embodiment, the TX LO and RX LO signals are generated by an on-chip LO power divider using an LO signal. The LO signal may be provided by a crystal oscillator. In one embodiment, the TX LO and RX LO signals are buffered by LO buffers. In one embodiment, the single-channel TRX includes a bias interface which can provide bias voltage sources for the single-channel TRX. In another embodiment, a pair of ADC and DAC are integrated with the single-channel TRX and the single-channel TRX can include a digital interface to interface with the digital domain of a digital signal processing unit (such as the digital signal processing unit of FIG. 3).

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A radio frequency (RF) frontend circuit, comprising:
a plurality of single-channel transceivers, each corresponding to one of a plurality of channels respectively, wherein each of the single-channel transceivers is configured to transmit and receive signals in a respective frequency band of a plurality of non-overlapping frequency bands, using a corresponding local oscillator (LO) signal generated based on the respective frequency band, with one of a plurality of directional antennas each corresponding to one of a plurality of radiation angles respectively, and wherein each of the single-channel transceivers comprises:
a local oscillator power divider to receive the corresponding LO signal generated for the respective frequency band and to generate a receive (RX) LO signal and a transmit (TX) LO signal based on the corresponding LO signal,
a receive chain coupled to the LO power divider, wherein the receive chain comprises:
an RX LO buffer to receive and to buffer the RX LO signal,
an RX LO in-phase/quadrature (I/Q) generation network coupled to the RX LO buffer to generate an in-phase component of the RX LO signal and a quadrature component of the RX LO signal,
a down-convert mixer to down convert an RF RX signal received from a respective directional antenna to generate an RX intermediate frequency (IF) in-phase component signal and an RX IF quadrature component signal based on the in-phase component of the RX LO signal and the quadrature component of the RX LO signal, wherein the respective directional antenna is configured to track a user movement within the corresponding radiation angle, and
an RX IF I/Q generation network coupled to the down-convert mixer to generate an RX IF output signal based on the RX IF in-phase component signal and the RX IF quadrature component signal,
a transmit chain coupled to the LO power divider, wherein the transmit chain comprises:
a TX LO buffer to receive and to buffer the TX LO signal,
a TX LO I/Q generation network coupled to the TX LO buffer to generate an in-phase component of the TX LO signal and a quadrature component of the TX LO signal,
a TX IF I/Q generation network to receive a TX IF signal and to generate a TX IF in-phase component signal and a TX IF quadrature component signal, and
an up-convert mixer to up convert the TX IF in-phase component signal and the TX IF quadrature component signal based on the in-phase component of the TX LO signal and the quadrature component of the TX LO signal, to generate an RF TX signal to be transmitted via the respective directional antenna;
a plurality of analog-to-digital converters (ADCs), each coupled to one of the plurality of single-channel transceivers;
a plurality of digital-to-analog converters (DACs), each coupled to the one of the plurality of single-channel transceivers; and a digital signal processing (DSP) unit coupled to the plurality of ADCs and the plurality of DACs, wherein the DSP unit is configured to:
generate a first plurality of digital data streams and synchronize each of the first plurality of digital data streams in time, wherein each of the first plurality of digital data streams is converted by a respective one of the plurality of DACs into an analog data stream to be transmitted to a remote device by a respective one of the single-channel transceivers, and
process a second plurality of digital data streams received from the plurality of ADCs respectively, including synchronizing each of the second plurality of digital data streams in time, each of the second plurality of digital data streams being received via the corresponding radiation angle,
wherein each of the single-channel transceivers further comprises a switching device coupled to the respective directional antenna, the receive chain, and the transmit chain, wherein the switching device is configured to selectively couple the receive chain or the transmit chain to the respective directional antenna to receive or transmit RF signals via the respective directional antenna respectively, wherein the RF frontend circuit is integrated as a single IC chip.

2. The RF frontend circuit of claim 1, wherein each of the plurality of single-channel transceivers transmits and receives an independent data stream.

3. The RF frontend circuit of claim 1, wherein each of the second plurality of digital data streams is received by a respective one of the plurality of single-channel transceivers via a specific radiation angle.

4. The RF frontend circuit of claim 1, wherein the down-convert mixer comprises:
an in-phase path (I-path) down-convert mixer coupled to the switching device to receive the RF RX signal and to down convert the RF RX signal to generate the RX IF in-phase component signal; and
a quadrature path (Q-path) down-convert mixer coupled to the switching device to receive the RF RX signal and to down convert the RF RX signal to generate the RX IF quadrature component signal based on the quadrature component of the RX LO signal.

5. The RF frontend circuit of claim 4, wherein the receive chain further comprises a low-noise amplifier (LNA) coupled between the switching device and the I-path and Q-path down-convert mixers to amplify the RF RX signal received from the respective directional antenna.

6. The RF frontend circuit of claim 5, wherein the receive chain further comprises:
a first variable gain amplifier (VGA) coupled between the I-path down-convert mixer and the RX IF I/Q generation network to amplify the RX IF in-phase component signal; and
a second VGA coupled between the Q-path down-convert mixer and the RX IF I/Q generation network to amplify the RX IF quadrature component signal.

7. The RF frontend circuit of claim 6, wherein the receive chain further comprises a third VGA coupled between the RX IF I/Q generation network and a corresponding ADC to amplify the RX IF output signal.

8. The RF frontend circuit of claim 1, wherein the up-convert mixer comprises:
an in-phase path (I-path) up-convert mixer coupled to the TX IF I/Q generation network to receive the TX IF in-phase component signal and to up convert the TX IF in-phase component signal based on the in-phase component of the TX LO signal; and
a quadrature path (Q-path) up-convert mixer coupled to the TX IF I/Q generation network to receive the TX IF quadrature component signal and to up convert the TX IF quadrature component signal based on the quadrature component of the TX LO signal.

9. The RF frontend circuit of claim 8, wherein the transmit chain further comprises a power amplifier (PA) coupled between the switching device and the I-path and Q-path up-convert mixers to amplify the RF TX signal to be transmitted via the respective directional antenna.

10. The RF frontend circuit of claim 9, wherein the transmit chain further comprises:
a first variable gain amplifier (VGA) coupled between the I-path up-convert mixer and the TX IF I/Q generation network to amplify the TX IF in-phase component signal; and
a second VGA coupled between the Q-path up-convert mixer and the TX IF I/Q generation network to amplify the TX IF quadrature component signal.

11. An electronic device, comprising:
a plurality of directional antennas, each corresponding to one of a plurality of radiation angles respectively;
a radio frequency (RF) frontend circuit, wherein the RF frontend circuit comprises:
a plurality of single-channel transceivers, each corresponding to one of a plurality of channels respectively, wherein each of the single-channel transceivers is configured to transmit and receive signals in a respective frequency band of a plurality of non-overlapping frequency bands, using a corresponding local oscillator (LO) signal generated based on the respective frequency band, with a respective directional antenna of the plurality of directional antennas, and wherein each of the single-channel transceivers comprises:
a local oscillator power divider to receive the corresponding LO signal generated for the respective frequency band and to generate a receive (RX) LO signal and a transmit (TX) LO signal based on the corresponding LO signal,
a receive chain coupled to the LO power divider, wherein the receive chain comprises:
an RX LO buffer to receive and to buffer the RX LO signal,
an RX LO in-phase/quadrature (I/Q) generation network coupled to the RX LO buffer to generate an in-phase component of the RX LO signal and a quadrature component of the RX LO signal,
a down-convert mixer to down convert an RF RX signal received from a respective directional antenna to generate an RX intermediate frequency (IF) in-phase component signal and an RX IF quadrature component signal based on the in-phase component of the RX LO signal and the quadrature component of the RX LO signal, wherein the respective directional antenna is configured to track a user movement within the corresponding radiation angle, and
an RX IF I/Q generation network coupled to the down-convert mixer to generate an RX IF output signal based on the RX IF in-phase component signal and the RX IF quadrature component signal, a transmit chain coupled to the LO power divider, wherein the transmit chain comprises:
  a TX LO buffer to receive and to buffer the TX LO signal,
  a TX LO I/Q generation network coupled to the TX LO buffer to generate an in-phase component of the TX LO signal and a quadrature component of the TX LO signal,
  a TX IF I/Q generation network to receive a TX IF signal and to generate a TX IF in-phase component signal and a TX IF quadrature component signal, and
  an up-convert mixer to up convert the TX IF in-phase component signal and the TX IF quadrature component signal based on the in-phase component of the TX LO signal and the quadrature component of the TX LO signal, to generate an RF TX signal to be transmitted via the respective directional antenna;
a plurality of analog-to-digital converters (ADCs), each coupled to one of the plurality of single-channel transceivers;
a plurality of digital-to-analog converters (DACs), each coupled to the one of the plurality of single-channel transceivers; and
a digital signal processing (DSP) unit coupled to the plurality of ADCs and the plurality of DACs, wherein the DSP unit is configured to:
  generate a first plurality of digital data streams and synchronize each of the first plurality of digital data streams in time, wherein each of the first plurality of digital data streams is converted by a respective one of the plurality of DACs into an analog data stream to be transmitted to a remote device by a respective one of the single-channel transceivers, and
  process a second plurality of digital data streams received from the plurality of ADCs respectively, including synchronizing each of the second plurality of digital data streams in time, each of the second plurality of digital data streams being received via the corresponding radiation angle,
wherein each of the single-channel transceivers further comprises a switching device coupled to the respective directional antenna, the receive chain, and the transmit chain, wherein the switching device is configured to selectively couple the receive chain or the transmit chain to the respective directional antenna to receive or transmit RF signals via the respective directional antenna respectively, wherein the RF frontend circuit is integrated as a single IC chip; and
a baseband processor coupled to the RF frontend circuit.

12. The electronic device of claim 11, wherein each of the plurality of single-channel transceivers transmits and receives an independent data stream.

13. The electronic device of claim 11, wherein each of the second plurality of digital data streams is received by a respective one of the plurality of single-channel transceivers via a specific radiation angle.

14. The electronic device of claim 11, wherein the down-convert mixer comprises:
  an in-phase path (I-path) down-convert mixer coupled to the switching device to receive the RF RX signal and to down convert the RF RX signal to generate the RX IF in-phase component signal; and
  a quadrature path (Q-path) down-convert mixer coupled to the switching device to receive the RF RX signal and to down convert the RF RX signal to generate the RX IF quadrature component signal based on the quadrature component of the RX LO signal.

15. The electronic device of claim 14, wherein the receive chain further comprises a low-noise amplifier (LNA) coupled between the switching device and the I-path and Q-path down-convert mixers to amplify the RF RX signal received from the respective directional antenna.

16. The electronic device of claim 15, wherein the receive chain further comprises:
  a first variable gain amplifier (VGA) coupled between the I-path down-convert mixer and the RX IF I/Q generation network to amplify the RX IF in-phase component signal; and
  a second VGA coupled between the Q-path down-convert mixer and the RX IF I/Q generation network to amplify the RX IF quadrature component signal.

17. The electronic device of claim 16, wherein the receive chain further comprises a third VGA coupled between the RX IF I/Q generation network and a corresponding ADC to amplify the RX IF output signal.

18. The electronic device of claim 11, wherein the up-convert mixer comprises:
  an in-phase path (I-path) up-convert mixer coupled to the TX IF I/Q generation network to receive the TX IF in-phase component signal and to up convert the TX IF in-phase component signal based on the in-phase component of the TX LO signal; and
  a quadrature path (Q-path) up-convert mixer coupled to the TX IF I/Q generation network to receive the TX IF quadrature component signal and to up convert the TX IF quadrature component signal based on the quadrature component of the TX LO signal.

19. The electronic device of claim 18, wherein the transmit chain further comprises a power amplifier (PA) coupled between the switching device and the I-path and Q-path up-convert mixers to amplify the RF TX signal to be transmitted via the respective directional antenna.

20. The electronic device of claim 19, wherein the transmit chain further comprises:
  a first variable gain amplifier (VGA) coupled between the I-path up-convert mixer and the TX IF I/Q generation network to amplify the TX IF in-phase component signal; and
  a second VGA coupled between the Q-path up-convert mixer and the TX IF I/Q generation network to amplify the TX IF quadrature component signal.

\* \* \* \* \*

UNITED STATES PATENT AND TRADEMARK OFFICE
CERTIFICATE OF CORRECTION

| | | |
|---|---|---|
| PATENT NO. | : 12,250,018 B1 | Page 1 of 1 |
| APPLICATION NO. | : 18/825578 | |
| DATED | : March 11, 2025 | |
| INVENTOR(S) | : Taiyun Chi, Hua Wang and Thomas Chen | |

It is certified that error appears in the above-identified patent and that said Letters Patent is hereby corrected as shown below:

On the Title Page

Please insert Item (63):
--Related U.S. Application Data
Continuation of application No. 15/980,529, filed on May 15, 2018.--.

Signed and Sealed this
Twenty-ninth Day of April, 2025

Coke Morgan Stewart
*Acting Director of the United States Patent and Trademark Office*